United States Patent [19]

Zeuner et al.

[11] Patent Number: 4,671,488
[45] Date of Patent: Jun. 9, 1987

[54] REVERSING ORIFICE ASSEMBLY FOR A SOLENOID OPERATED VALVE ASSEMBLY

[76] Inventors: Kenneth W. Zeuner, 43 Red Fox Dr., New Hope, Pa. 18938; Steven K. Zeuner, 39 Larch Cir.; Thomas A. Zeuner, 230 Woodlake Dr., both of Holland, Pa. 18966

[21] Appl. No.: 568,659

[22] Filed: Jan. 6, 1984

[51] Int. Cl.$^4$ ............................................. F16K 47/00
[52] U.S. Cl. .............................. 251/118; 251/129.15; 137/625.33
[58] Field of Search ........... 251/141, 129, 118, 129.15; 137/549, 625.33

[56] References Cited

U.S. PATENT DOCUMENTS 2,936,780  5/1960  Pratt ..................................... 251/118
3,936,030  2/1976  Putschky ............................. 251/141

FOREIGN PATENT DOCUMENTS 645265  7/1962  Canada ................................. 251/141

Primary Examiner—William E. Lyddane
Assistant Examiner—Gerald A. Anderson
Attorney, Agent, or Firm—Ratner & Prestia

[57] ABSTRACT

A single stage solenoid operated valve assembly of the cartridge type having a reversing flow orifice assembly with a side port, bottom port and an orifice. A poppet is adapted to seat in and close the orifice for controlling fluid flow between the side and bottom ports. A transverse flow passage provides fluid communication between the side port and the orifice and a pair of longitudinal flow passages provide fluid communication between the bottom port and a chamber above the poppet. An axis normal to the longitudinal axis of both longitudinal flow passages is also normal to the axis of the transverse flow passage. In this way pressure over the poppet is provided when fluid pressure is applied to the bottom port and pressure under the poppet is provided when fluid pressure is applied to the side port.

3 Claims, 4 Drawing Figures

4,671,488

REVERSING ORIFICE ASSEMBLY FOR A SOLENOID OPERATED VALVE ASSEMBLY

This application is being filed concurrently with application Ser. No. 568,599 for ELECTROHYDRAULIC VALVE ASSEMBLIES AND METHOD having similar subject matter and the same applicants.

BACKGROUND OF THE INVENTION

A. Field of the Invention

This invention relates to the field of solenoid operated electrohydraulic poppet valve assemblies.

B. Background Art

Normally open and normally closed solenoid operated poppet valve assemblies of the cartridge type are well known for installation in manifold blocks. During manufacture, it has been preferred to drill the manifold block so that, for normally closed cartridge valves, pressure is applied to the valve side port while for normally open cartridge valves, the block provides pressure to the bottom port or under the poppet. Thus, in an installed valve assembly of the normally closed type, pressure applied through the side port has been directed over the poppet to aid in the seating of the poppet in normally closed operation. On the other hand, for previously installed normally open valves, the pressure under the poppet is aided in maintaining the poppet normally open.

However, in the field, it has been desired to field change from normally closed to normally open, or vise versa. However, the pressure ports in the manifold have been opposite to their ideal arrangement. For example, to make a field change from normally closed where pressure from the manifold side port is over the poppet, it has been known to spring bias open a normally open assembly to attempt to change the operation of the valve and avoid the undesired and costly redrilling of the manifold. Such a field solution leaves a lot to be desired since pressure applied over the poppet tends to keep the poppet closed and the spring must have more preload force than orifice area times pressure. If the operating pressure rises above that spring preload on a pressure pulse, the assembly has adversely locked up the poppet. Specifically, the pressure times area exceeded the spring load and the poppet has stayed in the orifice whether or not the coil has been energized.

It has been known in a two-stage valve as shown in U.S. Pat. No. 3,903,919 to provide flow from a bottom and side port to over and under the poppet, respectively.

Accordingly, an object of the present invention is an orifice assembly for a cartridge type, single stage solenoid operated valve assembly which reverses the flow coming from the side port or from the bottom port.

SUMMARY OF THE INVENTION

A single stage solenoid operated valve assembly having a reversing flow orifice assembly with a side port, a bottom port and an orifice. A poppet moves between a valve open state and a stage seating in and closing the orifice for controlling fluid flow between the side and bottom ports. The orifice assembly has a transverse flow passage providing fluid communication between the side port and the orifice. A pair of longitudinal flow passages provide fluid communication between the bottom port and a chamber above the poppet. An axis normal to the long axis of both longitudinal passages is also normal to the axis of the transverse flow passage. In this manner there is provided (1) pressure over the poppet when the pressure is applied to the bottom port and (2) pressure under the poppet when pressure is applied to the side port.

DETAILED DESCRIPTION

Figure 1:
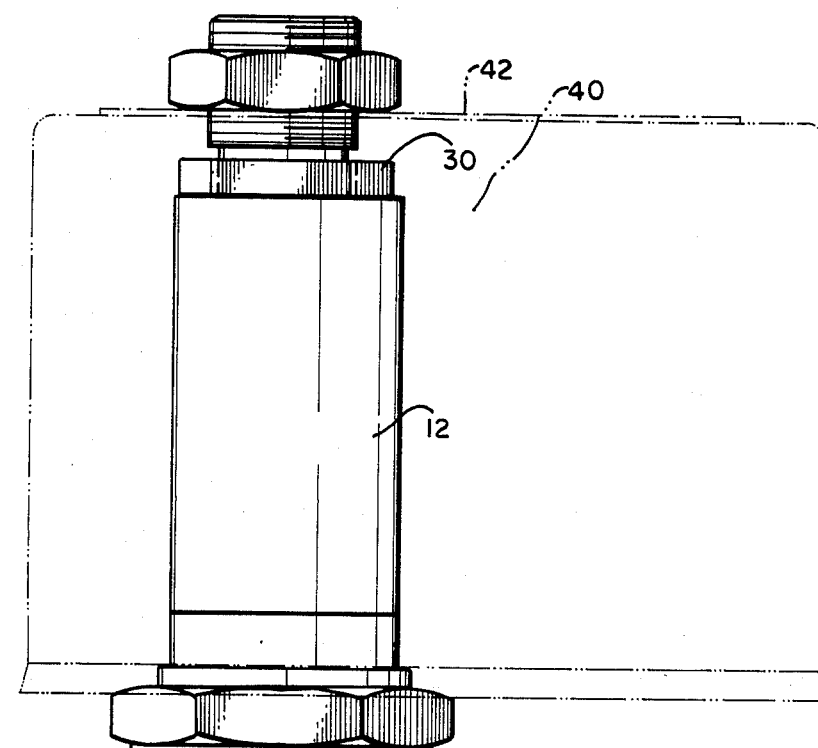
FIG. 1 is an elevational sectional view of the orifice assembly for a solenoid operated valve assembly of the present invention.
Figure 2:
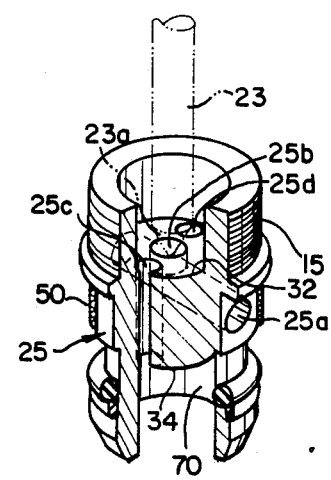
FIG. 2 is a perspective cut-away view of the orifice assembly and poppet of FIG. 1.
Figure 3:
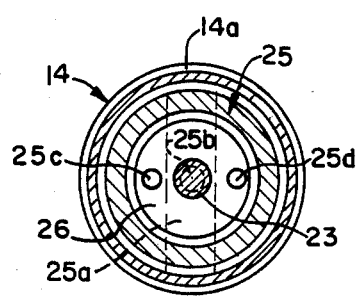
FIG. 3 is a top sectional view of the valve assembly of FIG. 1 taken along lines 3—3.
Figure 4:
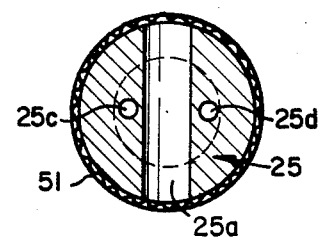
FIG. 4 is a top sectional view of the valve assembly of FIG. 1 taken along line 4—4.

Referring now to FIGS. 1-4, there is shown a single stage normally closed solenoid operated poppet valve assembly 10 of the conventional cartridge type adapted to be installed in a manifold block. It will be understood that assembly 10 may be a normally open valve assembly. Valve assembly 10 comprises a central body section 14 which at a lower portion has internal threads 16 which engage outer upper threads 15 of orifice assembly 25. Section 14 at its upper portion threadedly engages a sleeve 12 which, in turn, threadedly engages an end stop section 30 as described in more detail in applicant's copending application Ser. No. 568,599 cited above. For cartridge mounting purposes, outer threads 14a are formed on a lower portion of body section 14 to threadedly engage the internal threads of an opening in a conventional manifold block (not shown). O-ring 45 provides the necessary sealing between assembly 10 and the block.

Assembly 25 has a filter screen 51 covering a side port 50 which leads to a transversely directed tubular flow passage or central chamber 25a which extends through the entire transverse dimension of orifice assembly 25. Chamber 25a is in fluid communication with an upwardly axially extending orifice 25b which provides a seat for a plug 23a of axially extended poppet 23. Vertical channels 25c,d are formed parallel to and equally on either side of orifice 25b and extend between upper chamber 26 and bottom port 70. An axis normal to the long axis of both channels 25c,d is also normal to the axis of channel 25a. In this way the flow through channels 25c,d does not interfere with that of channel 25a. More specifically, transverse surfaces 32,34 form between them a solid section through which channels 25a,b,c and d extend, but orifice 25b only extends through the upper portion to channel 25a.

In operation it will be seen that for normally closed valves in which pressure is to be applied over the poppet, flow may be traced from port 70 through channels 25c,d into inner chamber 26 over poppet 23 and then through orifice 25b, chamber 25a to side port 50. On the other hand, for normally closed operation in which pressure is applied under the poppet, then flow is the opposite to that described above in which pressure is applied from port 50 through chamber 25a and then to orifice 25b, chamber 26 and then through channels 25c,d to port 70. Such flow from side port 50 and under poppet 23 is that required for a normally open valve assembly.

It will now be understood that orifice assembly 25 provides a reversing effect with respect to side port 50 and bottom port 70 as compared with a conventional orifice assembly. Thus, a conventional orifice assembly would provide (1) pressure over poppet 23 if pressure were applied from side port 50 or (2) pressure under poppet 23 if pressure were applied from bottom port 70. Thus, if a manifold provided pressure to side port 50, a normally open valve assembly could be accommodated by using orifice assembly 25 which provides pressure under the poppet when pressure is applied from port 50. Normally closed pressure under poppet operation could also be accommodated in this way. Alternatively, if the manifold provides pressure into port 70, normally closed operation with pressure over poppet may be provided by assembly 25 which communicates pressure over poppet 23 for a normally closed application.

For a source of magnetic flux there is provided a coil 40 which receives in its central opening end stop section 30, sleeve 12 and the upper portion of section 14. A cover 42 encloses and protects coil 40.

Although the invention has been particularly shown and described with reference to a preferred embodiment thereof, it will be understood by those skilled in the art that various changes may be made therein without departing from the spirit or scope of the invention.

What is claimed is:

1. A single stage cartridge type solenoid operated valve assembly comprising:

a reversing flow orifice assembly, having two side ports, a bottom port, an orifice and a long dimension, plug means movable along the long dimension of the valve assembly between a valve open state and a state seating in and closing said orifice for controlling fluid flow between said side ports and said bottom port;

the bottom port forming a longitudinally extending lower open chamber in the orifice assembly for extending into the manifold, the orifice assembly having a single transverse flow passage providing fluid communication between the two side ports and the orifice, a pair of longitudinal flow passages providing fluid communication between the lower open chamber of the bottom port and an upwardly extending open chamber above the orifice, the transverse flow passage being disposed between the upwardly extending open chamber and the lower open chamber and between the longitudinal flow passages and comprising the only fluid communication on the side of the orifice assembly, an axis normal to the long axis of both longitudinal flow passages being also normal to the axis of the transverse flow passage whereby there is fluid communication for providing pressure over the plug means when fluid pressure is applied to the bottom port and for providing pressure under the plug means when fluid pressure is applied to the side port.

2. The solenoid operated valve assembly of claim 1 in which there is provided a body section having lower internal threads for threadedly engaging outer threads of the upwardly extending chamber.

3. The solenoid operated valve assembly of claim 2 in which the transverse flow passage is disposed substantially centrally of the orifice assembly.

* * * * *